United States Patent [19]
Okada

[11] Patent Number: 5,684,386
[45] Date of Patent: Nov. 4, 1997

[54] CHARGING METHOD OF A SECONDARY BATTERY

[75] Inventor: Tetsuya Okada, Sumoto, Japan

[73] Assignee: Sanyo Electric Co. Ltd., Osaka, Japan

[21] Appl. No.: 544,795

[22] Filed: Oct. 18, 1995

[30]     Foreign Application Priority Data

Oct. 20, 1994  [JP]  Japan .................... 6-255189

[51] Int. Cl.$^6$ ........................ H01M 10/44; H02J 7/00
[52] U.S. Cl. .................... 320/21; 320/39; 320/35; 320/22; 320/48
[58] Field of Search ................. 320/21, 22–24, 320/48, 30, 31, 35, 36, 39, 40

[56]            References Cited

U.S. PATENT DOCUMENTS 5,204,611  4/1993  Nor et al. ........................ 320/21
5,350,996  9/1994  Tauchi ........................ 320/21 X
5,352,967  10/1994  Nutz et al. ........................ 320/21 X
5,541,491  7/1996  Yamazaki et al. ........................ 320/21 X

FOREIGN PATENT DOCUMENTS

3-253232  11/1991  Japan .
6-113474  4/1994  Japan .

Primary Examiner—Peter S. Wong
Assistant Examiner—K. Shin
Attorney, Agent, or Firm—Loeb & Loeb LLP

[57]            ABSTRACT

A secondary battery is charged in alternating charging and pulse-charging periods in which the secondary battery is continuously charged during the charging periods and the secondary battery is charged in a series of charging pulses during the pulse-charging periods. The terminal voltage or the temperature of the secondary battery may be sampled during at least one interval between the pulses in a pulse-charging period to detect a full charge level or an excessive temperature, respectively. Such an arrangement can reduce charging time and facilitate accurate monitoring of the terminal voltage or the temperature.

15 Claims, 5 Drawing Sheets

CHARGING METHOD OF A SECONDARY BATTERY

FIELD OF THE INVENTION

The present invention relates generally to secondary batteries, and more particularly, to a method for charging a secondary battery.

BACKGROUND OF THE INVENTION

A secondary battery is a battery that can be repetitively recharged. Such secondary batteries include nickel-cadmium secondary batteries, nickel-hydrogen secondary batteries and lithium ion secondary batteries. The charging characteristics of a secondary battery including the behavior of the battery terminal voltage as charging progresses, often depends upon the type of the secondary battery. For example, a nickel-cadmium battery has a charging characteristic in which the terminal voltage of the secondary battery typically peaks when the battery is fully charged, and thereafter decreases by a predetermined voltage ΔV. When a full charge level is detected by the detection of the peak or the decrease of the predetermined voltage ΔV, the charging will typically be completely shut off, reduced to a low level or otherwise modified.

Figure 1:
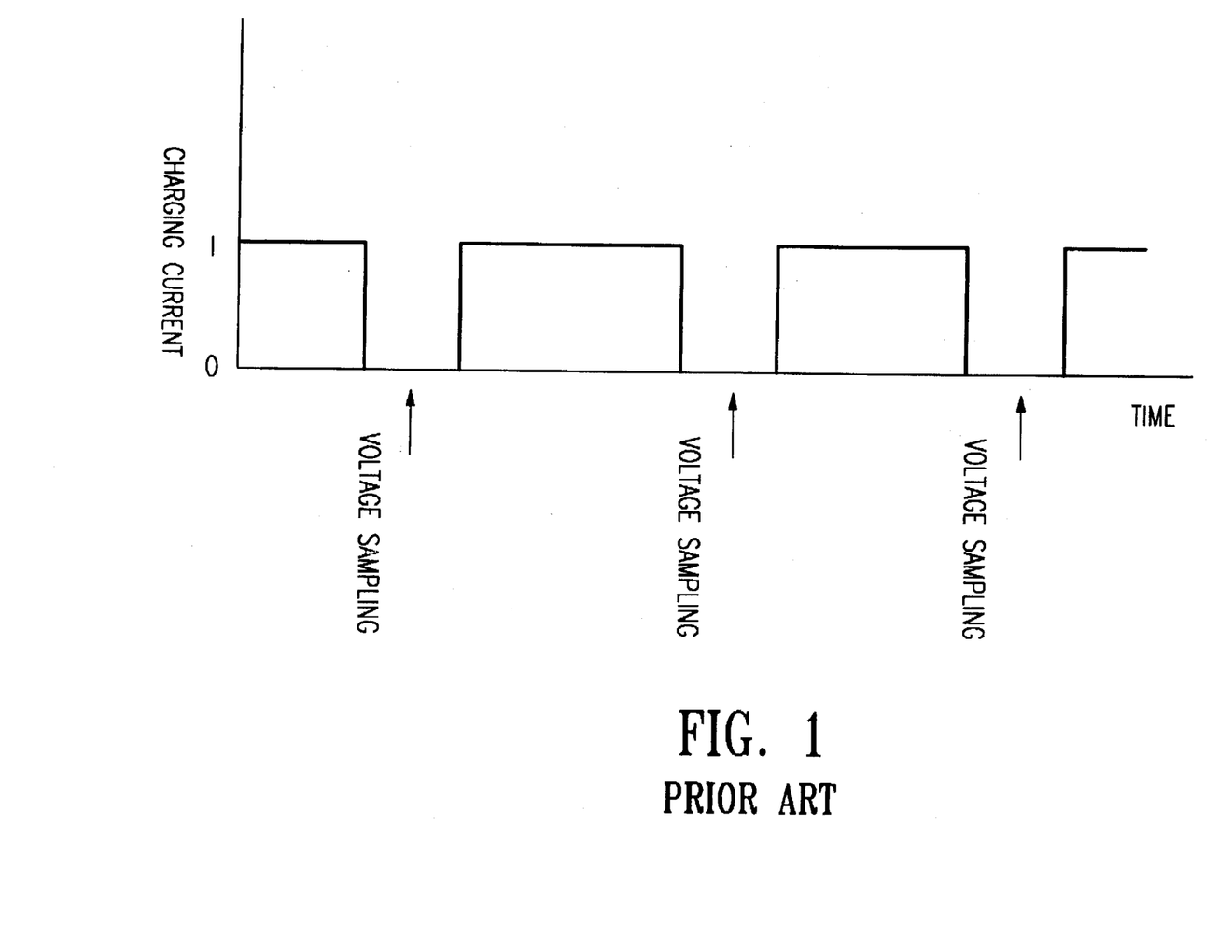
FIG. 1 is a graph showing the charging characteristics of a prior art charging process.

When the terminal voltage is monitored during normal charging, the monitored terminal voltage is usually much larger than the actual voltage of the secondary battery because of a voltage drop caused by contact resistances and by an internal resistance within the secondary battery. In order to reduce the voltage drop to permit the voltage of the secondary battery to be monitored more accurately, Japanese patent Laid-open No. HEI 3-253232 describes a charging method in which the terminal voltage of the secondary battery being charged is periodically sampled when the charging current is reduced during predetermined intervals to a small charging current value (approximately zero charging current) as shown in FIG. 1. During these intervals, the terminal voltage of the battery is approximately the same as its open circuit voltage which provides a good indication of the charge level of the secondary battery. However, because the charging is periodically stopped by periodic reductions in the charging current, the charging time to reach a full charge level can be excessively long.

Another charging characteristic is the temperature of the battery. The temperature of a secondary battery being charged can exhibit a sudden rise and can reach a level of, for instance, about 40°–45° C., in the case of a nickel-cadmium secondary battery, when the secondary battery is fully charged. Therefore, the full charge level can be detected by employing a sensor to detect such an increase in the battery temperature.

Also, when a secondary battery is charged rapidly, the temperature of the secondary battery can sometimes increase excessively. Charging at an excessive temperature may cause the secondary batteries to deteriorate. In order to avoid charging at excessive temperatures, one approach has been to monitor the temperature of the secondary battery while it is charged. Then, if the temperature exceeds a predetermined value, the charging will be stopped or otherwise modified. However, in some designs, the temperature measurements have often been inaccurate.

THE SUMMARY OF THE INVENTION

It is an object of the present invention to provide an improved secondary battery charger which reduces charging

2 time and accurately monitors various charging parameters including terminal voltage and temperature of the secondary battery.

These and other objects are achieved by a method of charging, in accordance with one embodiment of the present invention, which comprises: charging the secondary battery in alternating charging and pulse-charging periods in which the secondary battery is continuously charged during the charging periods and the secondary battery is charged in a series of charging pulses during the pulse-charging periods; sampling the terminal voltage or the temperature of the secondary battery during at least one interval between the pulses in a pulse-charging period; and modifying the charging based on the sampled terminal voltage or the sampled temperature.

In one embodiment, while the secondary battery is charged by series of the pulses, the terminal voltage or the temperature is sampled during the interval between the pulses. Therefore, the charging time can be reduced. Moreover, because the charging is stopped during the interval, the terminal voltage or the temperature is more accurately sampled.

DETAILED DESCRIPTION Of THE PREFERRED EMBODIMENTS

An embodiment in accordance with the present invention is described with reference to FIGS. 2–5. As explained in greater detail below, the secondary battery is charged in alternating charging and pulse-charging periods in which the secondary battery is continuously charged during the charging periods and the secondary battery is charged in series of charging pulses during the pulse-charging periods. Then, either the terminal voltage or the temperature (or both) of the secondary battery is sampled during at least one interval between the pulses in some or all of the pulse-charging periods to detect the full charge level or an excessive temperature. This method can reduce the charging time while at the same time accurately monitoring the terminal voltage or the temperature of the battery being charged.

Figure 2:
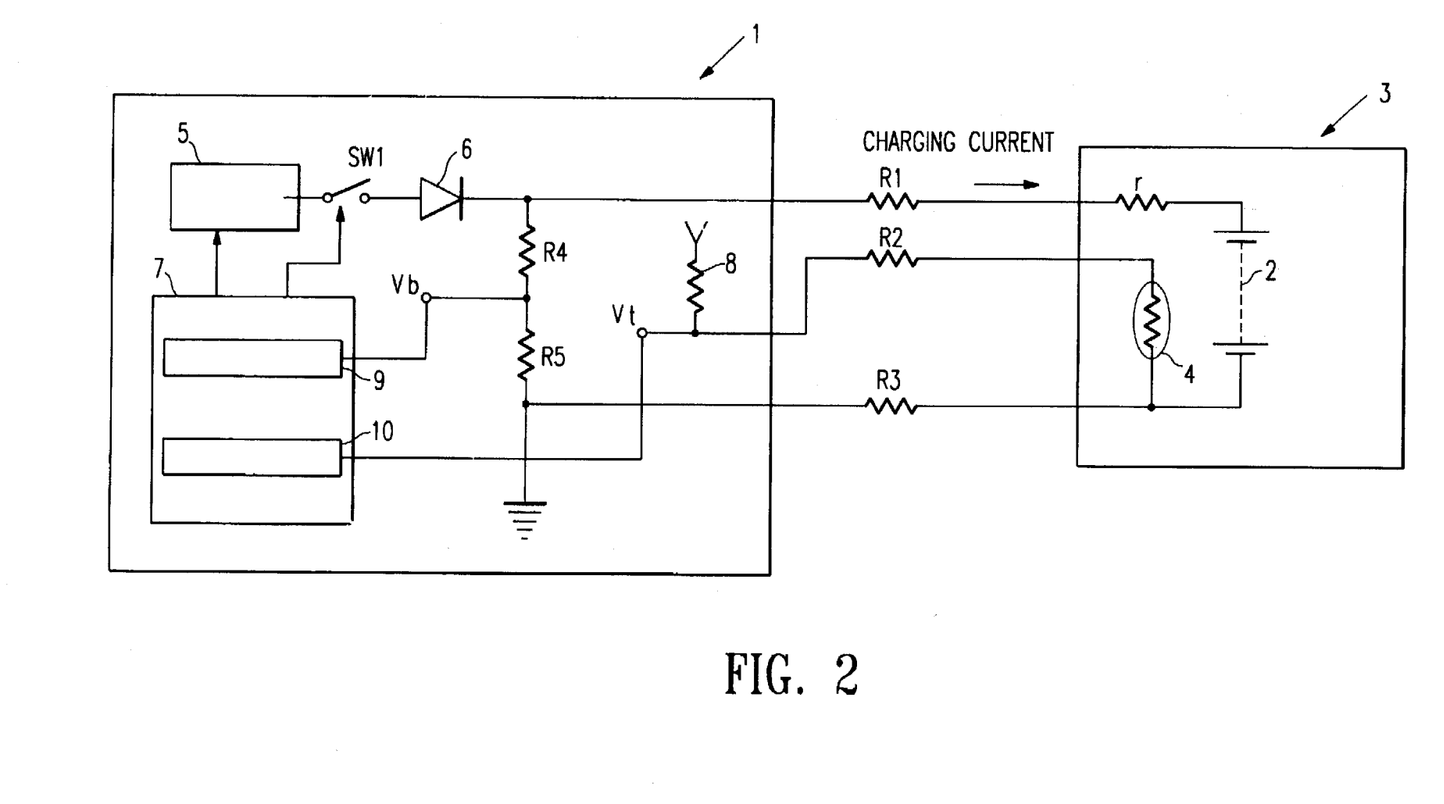
FIG. 2 is a charging circuit of a charging apparatus in accordance with one embodiment of the present invention.

FIG. 2 shows a charging circuit of a charging apparatus in accordance with one embodiment of the present invention. The charging apparatus comprises a battery charger 1 and a detachable battery pack 3 which includes a plurality of secondary batteries 2. A thermistor 4 is provided inside the battery back 3 to monitor the temperature of the secondary batteries 2 by monitoring the voltage across the thermistor 4.

One terminal of the thermistor 4 is connected to one terminal of the secondary batteries 2. Resistances R1, R2 and R3 represent the contact resistances between the battery pack 3 and the battery charger 1. More specifically, the resistance R1 is related to one terminal of the secondary batteries 2. The resistance R2 is related to one terminal of the thermistor 4. The resistance R3 is related to the other terminal of both the thermistor 4 and the battery pack 2. This connection design between the charger 1 and the battery pack 2 is conventional. When the temperature is monitored by monitoring the voltage across the thermistor 4 while the secondary battery is charged with a charging current (I), it has been found that it is difficult to monitor the temperature accurately. This difficulty may be explained as follows. When the charger 1 monitors the voltage across the thermistor 4, the monitored thermistor voltage is typically larger than the actual voltage across the thermistor 4, because a voltage drop is usually caused by the contact resistances R2 and R3. This additional monitored voltage drop (Vdrop) may be expressed as follows:

$$Vdrop=(R2 \times Icon)+(R3 \times (Icon+I))$$

wherein Icon is a constant current which is provided by a constant current source 8. Since the charging current (I) is usually set to a large value, for example, 1–3A, the voltage drop (Vdrop) is usually not small.

However, in accordance with the present invention, while the secondary battery is charged by a series of charging pulses, the temperature may be sampled during the interval when the charging current is stopped. Therefore, the temperature may be accurately sampled without the voltage drops caused by the large charging current through the contact resistance. As used herein, the term "the charging is stopped" is intended to include embodiments in which the charging current is completely shut off, as well as embodiments in which the charging current is reduced to a low level.

The battery charger 1 comprises a power source 5. A control switch 6 is connected between the power source 5 and the battery pack 3, and controls the charging state by either shutting off the charging current or maintaining charging. A calculating circuit 7 provides on-off control for the control switch 6, based on the temperature or the terminal voltage of the secondary batteries 2. The power source 5 provides a suitable and predetermined charging current or voltage according to the type of the secondary batteries 2 which can include, for example, a nickel-cadmium secondary battery, a nickel-hydrogen secondary battery or a lithium ion secondary battery.

The calculating circuit 7 is preferably a microcomputer system which includes a first A/D converter 9 and a second A/D converter 10. The first A/D converter 9 receives analog data reprsentative of the terminal voltage (V) of the secondary batteries 2 and converts it to digital data. When charging is interrupted, the battery terminal voltage V is proportional to the voltage Vb across a resistor R4 of a series connected pair of resistances R4 and R5 as follows:

$$Vb=V \times R5/(R4+R5)$$

A constant current source 8 provides a constant current (Icon) to the thermistor 4. The resistance value (Rt) of the thermistor 4 corresponds to the temperature of the batteries of the battery pack. The second A/D convertor 10 receives analog data representative of the temperature in the form of the analog voltage signal Vt (Vt=Icon×Rt) and changes it to digital data. (The voltage drops of the contact resistances R2 and R3 may be effectively ignored because they are relatively small and the current Icon is relatively small.)

Then, the calculating circuit 7 calculates, based on the digital data representative of the terminal voltage and the temperature, and determines whether the full charge level or an excessive temperature has been reached. Depending upon the outcome of this determination, the calculating circuit 7 performs the on-off control of the control switch 6 to modify or resume the charging as appropriate. For example, in order to detect a full charge level of a nickel-cadmium secondary battery or a nickel-hydrogen secondary battery, the calculating circuit 7 will monitor the battery terminal voltage to detect either a peak or a decrease of a predetermined ΔV after the peak in the terminal voltage. If either is detected, the circuit 7 turns off the control switch 6 to modify the charging either by completely shutting off the charging current or reducing the charging current to a low level. In an alternative embodiment, the calculating circuit 7 can detect a full charge level by comparing the monitored temperature with a predetermined temperature value. If the monitored temperature exceeds the predetermined temperature value, the battery is considered to have been charged to a full level and the calculating circuit 7 turns off the control switch 6 to modify the charging.

In another embodiment, in order to protect the secondary battery from deterioration caused by charging to an excessive temperature, the charging apparatus monitors the temperature. If the monitored temperature exceeds a predetermined temperature value, the charging is modified.

In a further embodiment, by controlling the power source 5, a lithium ion secondary battery, for example, may be charged with a constant current until the terminal voltage reaches a predetermined voltage value. After that, the lithium ion secondary battery may be charged with a constant voltage until the full charge level is reached. Meanwhile the temperature is monitored to avoid charging to an excessive temperature.

Figure 3:
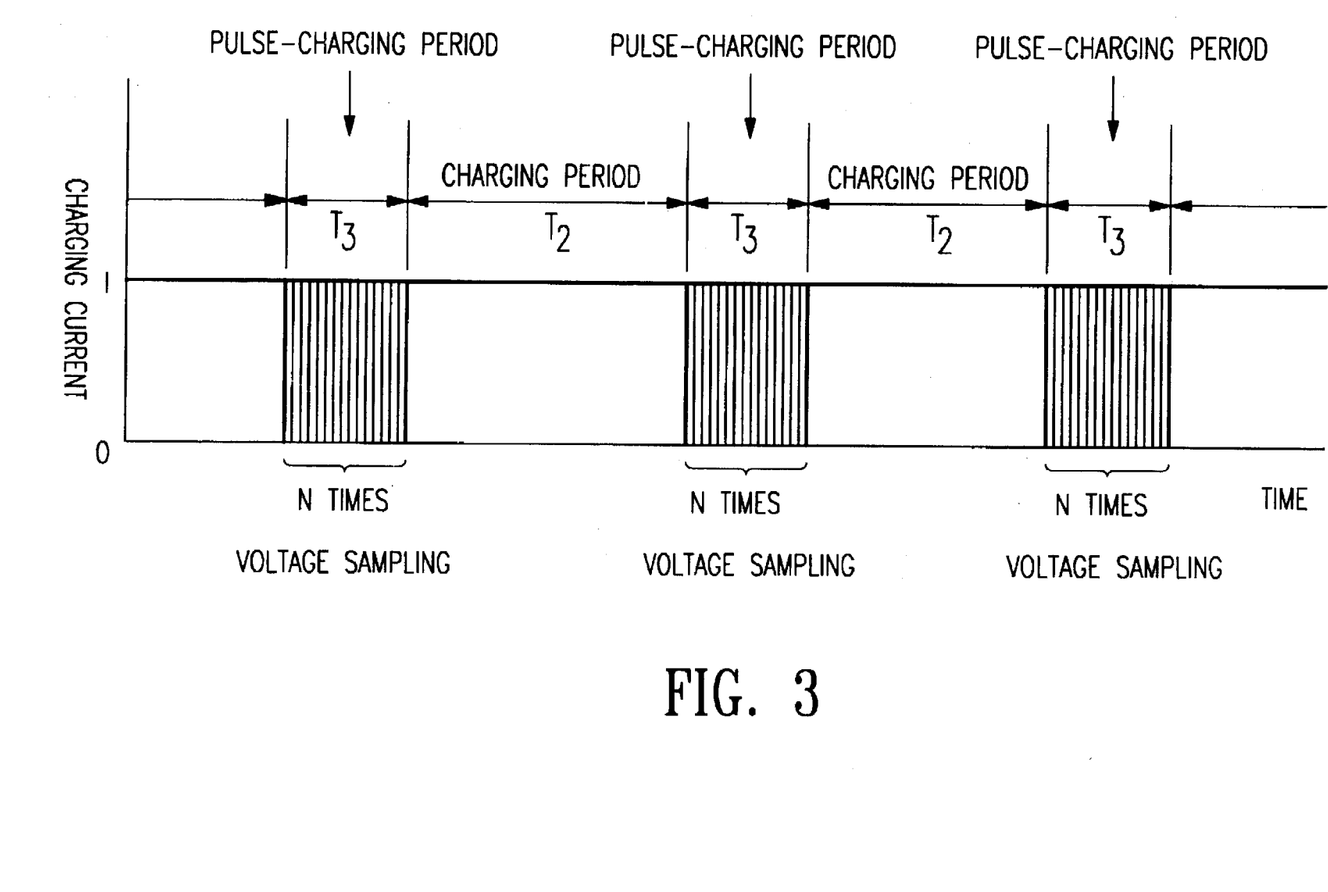
FIG. 3 is a graph of charging current for a charging process in accordance with an embodiment of the present invention.
Figure 4:
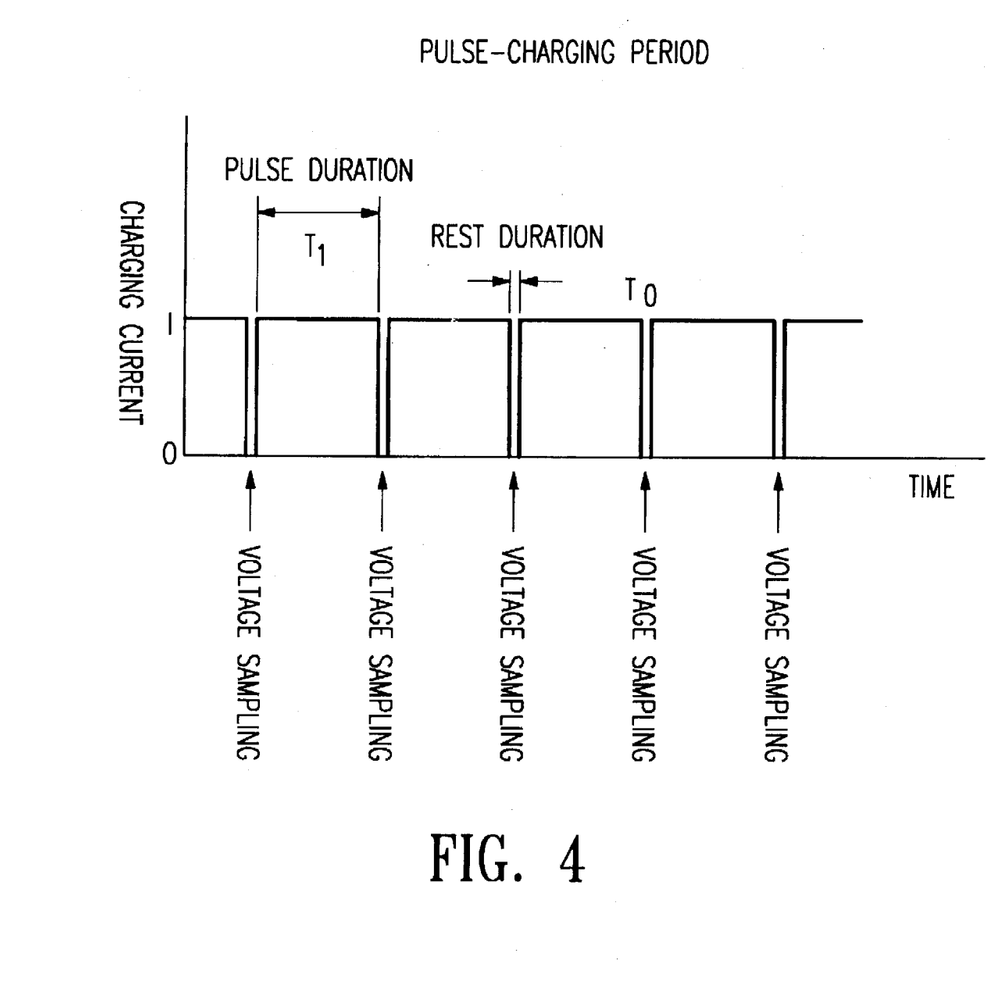
FIG. 4 is a detailed graph of FIG. 3 which has a lengthened time axis.

FIG. 3 shows the graph of a charging current (I) as a secondary battery is charged in accordance with one embodiment of the present invention. FIG. 4 shows a detailed view of a pulse charging period of the graph of FIG. 3 in which the time axis is expanded for clarity. As explained below, the secondary battery is charged in alternating periods of a rapid charging period (T2) and a pulse-charging period (T3) as shown in FIG. 3. During each charging period (T2), the secondary battery is continuously charged with a constant current. During each pulse-charging period (T3), the secondary battery is charged by series of charging pulses which each have a pulse duration (T1) (FIG. 4). In the illustrated embodiment, the charging pulses preferably have the same constant current value as the charging period (T2). As shown in FIG. 4, the intervals between the pulses each define a rest duration (T0).

In accordance with one aspect of the present invention, the terminal voltage of the secondary battery is sampled between each of the pulse durations (T1) during the rest durations (T0), to detect the full charge level. Also, the temperature of the secondary battery may be monitored between each of the pulse durations (T1) by sampling the voltage across the thermistor 4 during the rest durations (T0), in order to detect an excessive temperature which may cause the deterioration of the properties in the secondary battery. More specifically, the terminal voltage of the secondary battery or the voltage across the thermistor 4 may be monitored a predetermined number (N) of times during a particular pulse-charging period (T3).

By monitoring either the terminal voltage or the temperature a plurality of times, the charging apparatus can monitor these parameters more accurately. This may be better understood from the following explanation.

First, it has been found that the values of the contact resistances R1, R2, R3 sometimes change slightly each time the terminal voltage or the voltage across the thermistor 4 is monitored. This change in the values of the contact resistances in turn causes a change in the associated contact resistance voltage drops, when the terminal voltage or the voltage across the thermistor 4 is monitored while the charging is stopped. However, in this embodiment, the terminal voltage or the battery temperature is preferably monitored a predetermined number of times (N) during a particular pulse-charging period (T3). The calculating circuit 7 sums the monitored data, and calculates the average of the monitored data. By taking this average, the change in the voltage drops may be compensated.

Further, when the terminal voltage is monitored immediately following the cessation of charging, the terminal voltage has been found to change slightly with the passage of time as chemical reactions in the secondary battery stabilize. However, in this embodiment, since the terminal voltage or the voltage across the thermistor 4 is monitored the predetermined number of times (N) during a particular pulse-charging period (T3), and the calculating circuit 7 calculates the average of the monitored data, such changes can be compensated by the taking of such averages.

Moreover, the maximum value of the inputted data may be predetermined. This maximum value may be divided in a number of ranks, for example, 64 ranks for a 6 bit A/D for a 6 bit A/D converter, or 256 ranks for an 8 bit A/D converter. Then, when the analog data is inputted, the A/D converter can recognize the respective range to which the inputted analog data belongs. Then, the recognized respective rank is outputted as the digital data. When the actual analog data are around the boundary between two adjacent ranks, as a result of an error in measurement or the above-mentioned changes of value, the monitored analog data may be recognized as being in different ranks. Even though the differences of values caused by the error in measurement or the changes is small, the outputted digital data are recognized as being in the different ranks. However, in this embodiment, as the terminal voltage or the battery temperature is monitored the predetermined number (N) of times during the one pulse-charging periods (T3), then the calculating circuit 7 adds up the sum of monitored data, and calculates the average of the monitored data. The resulting average is considered to more accurately reflect the real analog data.

Figure 5:
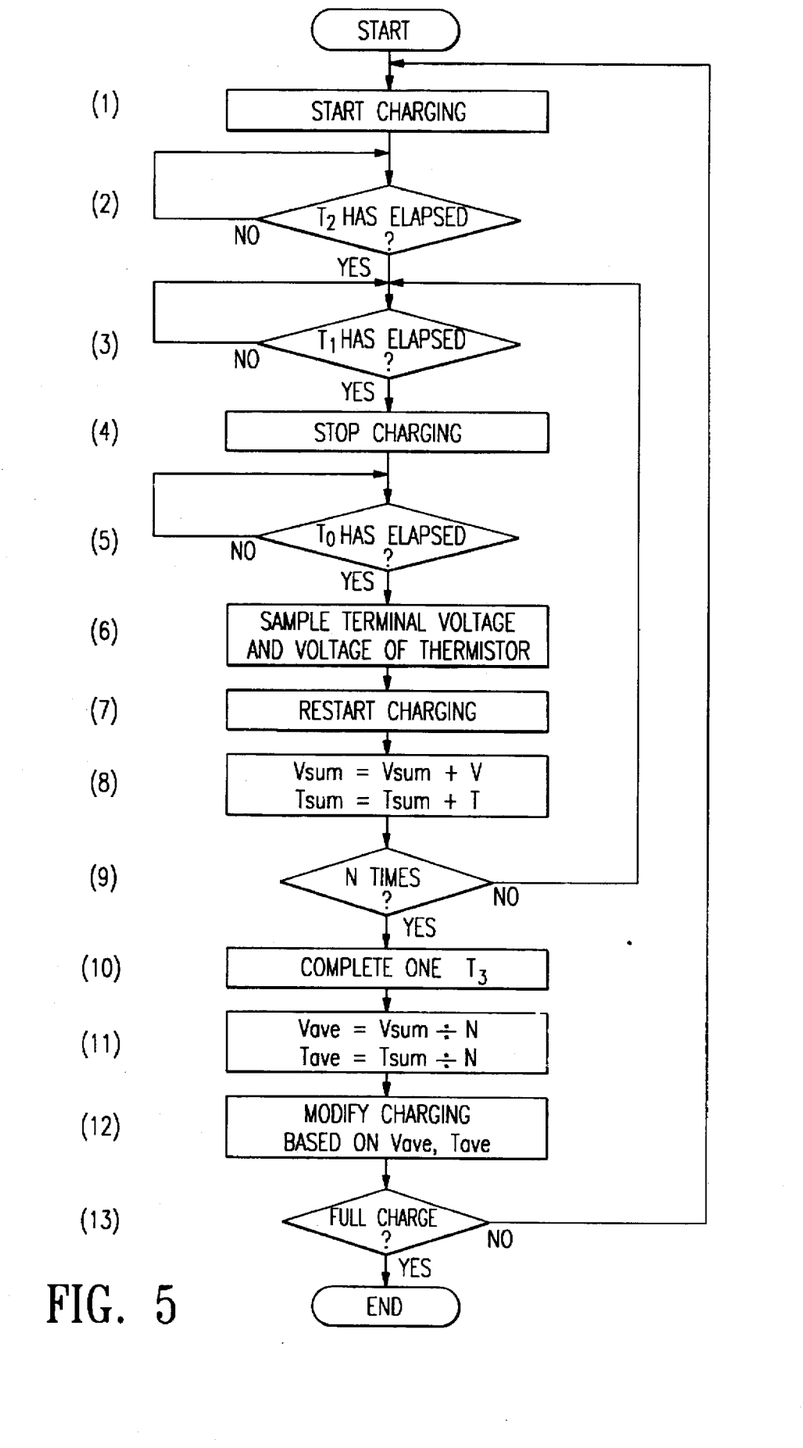
FIG. 5 is a flow chart showing a method of charging a secondary battery in accordance with an embodiment of the present invention.

A charging method in accordance with one embodiment of the present invention will be described below with reference to a flow chart shown in FIG. 5. This embodiment shows a method in which the full charge level is detected by monitoring the terminal voltage, and the secondary battery is prevented from being charged to an excessive temperature by monitoring the temperature.

The charging apparatus starts rapid charging when the calculating circuit 7 turns on the control switch 6 (step 1 ). A determination is made (step 2) as to whether the charging period (T2: e.g., 1 sec.) has elapsed. When the charging period (T2) is set to a relatively short time, the pulse-charging period can be repeated frequently, such that the charging apparatus can more accurately monitor the terminal voltage or the temperature. However, the overall charging time to reach the full charge level will typically be increased as well, because of the increased number of rest durations (T0) between the pulses. On balance, the charging period (T2) can be set to 0.2–60 sec., and preferably 0.3–30 sec., more preferably 0.5–10 sec.

After the charging time (T2) has elapsed, the pulse-charging starts. During the pulse-charging period (T3), the pulses of duration (T1) are separated by the rest durations (T0). During a rest duration (T0), the terminal voltage or the voltage of the thermistor is sampled.

A determination is made (step 3) as to whether the pulse duration (T1 :e.g., 1.6 msec.) has elapsed. During the pulse duration (T1), the secondary battery is charged with the same charging current as the charging period (T2) in this embodiment. The pulse duration (T1) is set to 0.3–100 msec., preferably 0.5–50 msec., and more preferably 1–30 msec. The pulse duration may be set to a shorter time than the charging periods (T2), because a longer pulse duration increases the charging time until the full charge level is reached.

After the pulse duration (T1) has elapsed, the charging apparatus stops the charging (step 4), by the calculating circuit 7 turning off the control switch 6. A determination is then made (step 5) as to whether the rest duration (T0: e.g.,0.1 msec) has elapsed.

If the rest duration (T0) has not elapsed, the process repeats step 5, such that the charging remains stopped. The rest duration (T0) is set to 0.01–10 msec., preferably 0.03–1 msec., and more preferably 0.05–0.5 msec. A longer rest duration typically increases the necessary charging time until the full charge level is reached. On the other hand, a shorter rest duration can increase the difficulty in detecting the terminal voltage or the temperature. For example, a fast A/D converter which can accommodate the monitoring of the terminal voltage or the voltage across the thermistor 4 during a relatively short rest duration can be expensive. Consequently, selection of the rest duration (T0) preferably would take into account the desired monitoring accuracy of the terminal voltage or the voltage across the thermistor 4, the desired charging time until the full charge level is reached and the cost of the A/D converter.

Once the rest duration (T0) has elapsed, the calculating circuit 7 samples the terminal voltage and the voltage across the thermistor 4, and converts the sampled terminal voltage and the sampled temperature into digital vales (step 6). The charging apparatus then restarts the rapid charging by turning the control switch 6 on (step 7).

In step 8, the digital data representative of the terminal voltage and the voltage across the thermistor 4 are respectively added to running sums (Vsum, Tsum). Before the first sampling, the sums are initialized to zero. Therefore, when the first sampled data are added to sums, the sums are equal to the first sampled data respectively.

A determination is made (step 9) as to whether the process has repeated steps 3–8 a predetermined number of times (N) (e.g., 256 times). In other words, a determination is made as to whether the calculating circuit 7 has sampled the terminal voltage and the voltage across the thermistor 4 the predetermined number of times (N). When the predetermined number of times (N) is set to a relatively high value, the terminal voltage and the voltage across the thermistor 4 are more accurately sampled. However, a large number of samples can increase the charging time until the full charge level is reached. Therefor, the predetermined number of times (N) can be set to $2^2$–$2^{10}$ times, preferably $2^4$–$2^{10}$ times, and more preferably $2^6$–$2^{10}$ times.

Once the calculating circuit 7 has sampled the terminal voltage and the voltage across the thermistor 4 the predetermined number (N) of times, the process completes one pulse-charging period (step 10). The calculating circuit 7 then calculates the average values of the terminal voltage and the temperature (step 11 ), dividing the sums in step 8 by the predetermined number of times (N).

In step 12, based on the calculated values of the terminal voltage and the temperature, the calculating circuit 7 may modify the charging. For example, when the calculated terminal voltage has reached a peak and thereafter has decreased by a predetermined voltage ΔV, the calculating circuit 7 detects the full charge level, and stops the charging. When the calculated temperature exceeds a predetermined temperature value which indicates an excessive temperature, the calculating circuit 7 stops the charging, by turning off the control switch 6, to prevent deterioration of the secondary battery by charging to an excessive temperature. If the secondary battery is determined (step 13) to have been fully charged, the process ends. Otherwise, if the secondary battery was not fully charged, charging is not modified and the process goes back to step 1, and repeats steps 1–13.

In the example above, the charging period (T2) is set to 1 sec., the pulse duration (T1) is set to 1.6 msec., and the rest duration (T0) is set to 0.1 msec. Therefore, the ratio of T1/T2 is 1/625, the ratio of T0/T1 is 1/16. The ratio of T1/T2 is preferably set to less than 1/10, and more preferably 1/3000–1/100, because the long pulse duration (T1) can make the pulse-charging period longer. The ratio of T0/T1 is preferably set to less than 1/2, and more preferably 1/100–1/5, because a longer rest duration (T0) can increase the charging time until the full charge level is reached.

In an alternative embodiment, the calculating circuit 7 can use the sums (Vsum, Tsum) instead of calculating the average, to modify the charging.

It will, of course, be understood that modifications of the present invention, in its various aspects will be apparent to those skilled in the art, some being apparent only after study and others being matters of routine electronic design. As such, the scope of the invention should not be limited by the particular embodiments herein described but should be defined only by the appended claims and equivalent thereof.

What is claimed is:

1. A method for charging a secondary battery, the method comprising:

charging the secondary battery in alternating continuous charging periods and pulse-charging periods in which the secondary battery is continuously charged during each continuous charging period and the secondary battery is charged by a series of charging pulses during each pulse-charging period;

sampling a terminal voltage of the secondary battery during at least one interval between the pulses during a pulse-charging period; and modifying the charging step based on the sampled terminal voltage.

2. A method according to claim 1, the method further including:

sampling the terminal voltage of the secondary battery during at least two intervals in each of the pulse-charging periods; and calculating an average of the sampled terminal voltages during the at least two intervals.

3. A method according to claim 1, the method further including modifying the charging step when the sampled terminal voltage exhibits at least one of a predetermined peak value and a decrease of a predetermined voltage ΔV after the peak value.

4. A method according to claim 1, wherein the step of charging includes applying a charging current and the step of modifying the charging step comprises one of shutting off the charging current and reducing the charging current to a lower level.

5. A method according to claim 1, the method further including:

setting the ratio of the duration of each pulse to the duration of each continuous charging period to less than 1/10; and setting the ratio of the duration of each interval between pulses to the duration of each pulse to less than 1/2.

6. A method according to claim 1, the method further comprising:

sampling a temperature of the secondary battery; and modifying the charging if the temperature exceeds a predetermined maximum.

7. A method of charging a secondary battery, the secondary battery having terminals, by supplying a current through the terminals of the second battery, the method comprising:

charging the secondary battery in alternating continuous charging periods and pulse-charging periods in which the secondary battery is continuously charged during each continuous charging period and the secondary battery is charged by a series of charging pulses during each pulse-charging period;

sampling a temperature of the secondary battery during at least one interval between the pulses during a pulse-charging period to provide a sampled temperature; and modifying the charging based on the sampled temperature.

8. A method according to claim 7, wherein in the step of sampling includes sampling the temperature during an interval in each of the pulse charging periods.

9. A method according to claim 7, wherein the step of sampling a temperature comprises sampling a voltage of a temperature detecting element which is thermally coupled to the secondary battery and has a terminal electrically coupled to the secondary battery.

10. A method according to claim 9, wherein the temperature detecting element is a thermistor.

11. A method according to claim 7, the method further including modifying the charging when the sampled temperature exceeds a predetermined temperature value.

12. A method according to claim 7, wherein the step of charging includes supplying a charging current to the secondary battery and the step of modifying the charging comprises one of shutting off the charging current and reducing the charging current to a lower level.

13. A method according to claim 7, the method further comprising:

setting the ratio of the duration of each pulse to the duration of the continuous charging period to less than 1/10; and setting the ratio of the duration of each interval between pulses to the duration of each pulse is set to less than 1/2.

14. A charging apparatus for charging a secondary battery, the apparatus comprising:

a circuit for charging the secondary battery in alternating continuous charging periods and pulse-charging periods in which the secondary battery is continuously charged during each continuous charging period and the secondary battery is charged by a series of charging pulses during each pulse-charging period;

a circuit for sampling the terminal voltage of the secondary battery during at least one interval between the pulses during a pulse-charging period; and a circuit for modifying the charging based on the sampled terminal voltage.

15. A charging apparatus for charging a secondary battery, comprising:

a circuit for charging the secondary battery in alternating continuous charging periods and pulse-charging periods in which the secondary battery is continuously charged during each continuous charging period and the secondary battery is charged by a series of charging pulses during each pulse-charging period;

a circuit for sampling a temperature of the secondary battery during at least one interval between the pulses during a pulse-charging period to provide a sampled temperature; and a circuit for modifying the charging based on the sampled temperature.

* * * * *